Nov. 21, 1967  R. K. GROVE ET AL  3,353,350
SUMP FOR SPACE VEHICLES
Filed March 28, 1967  3 Sheets-Sheet 1
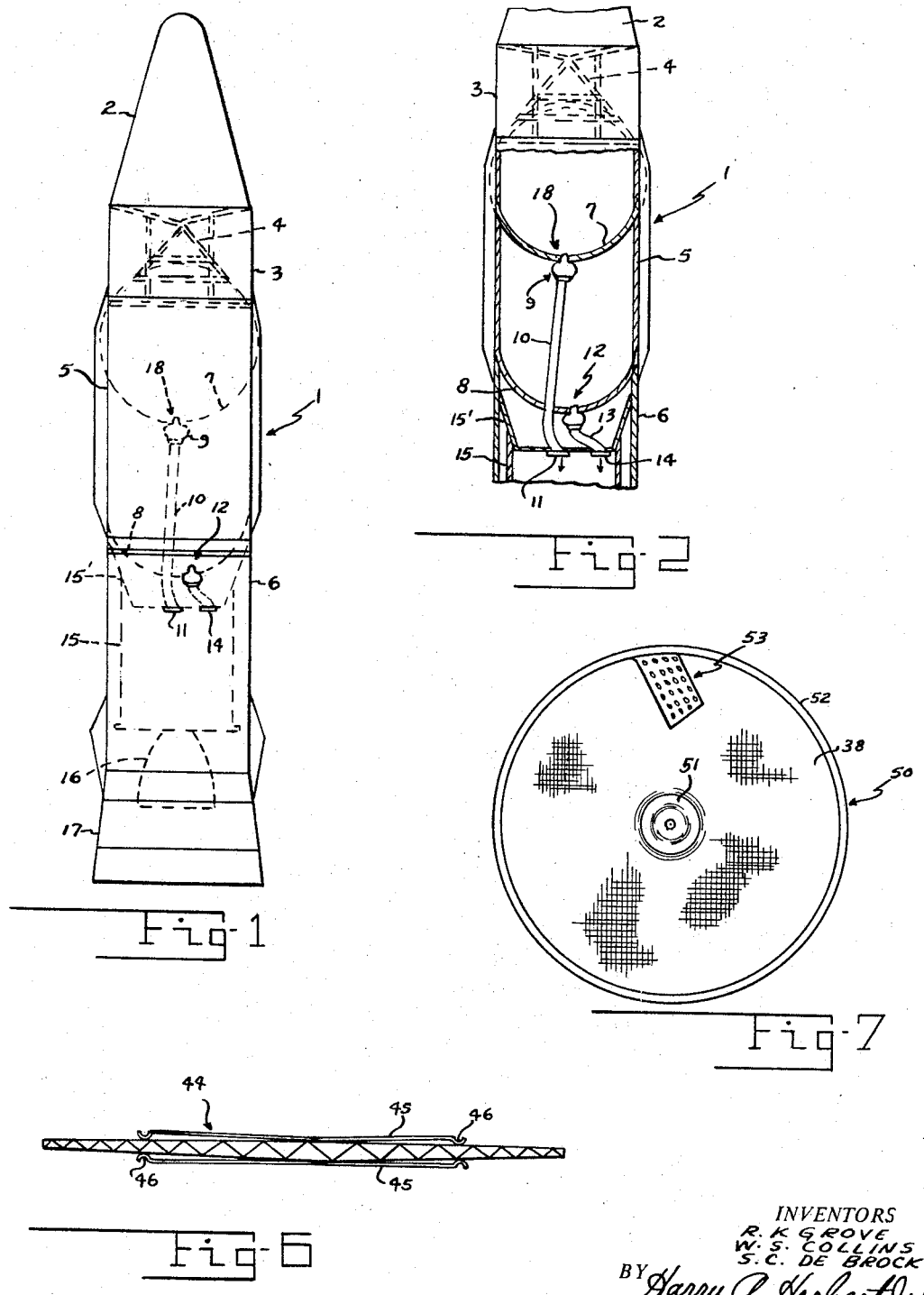

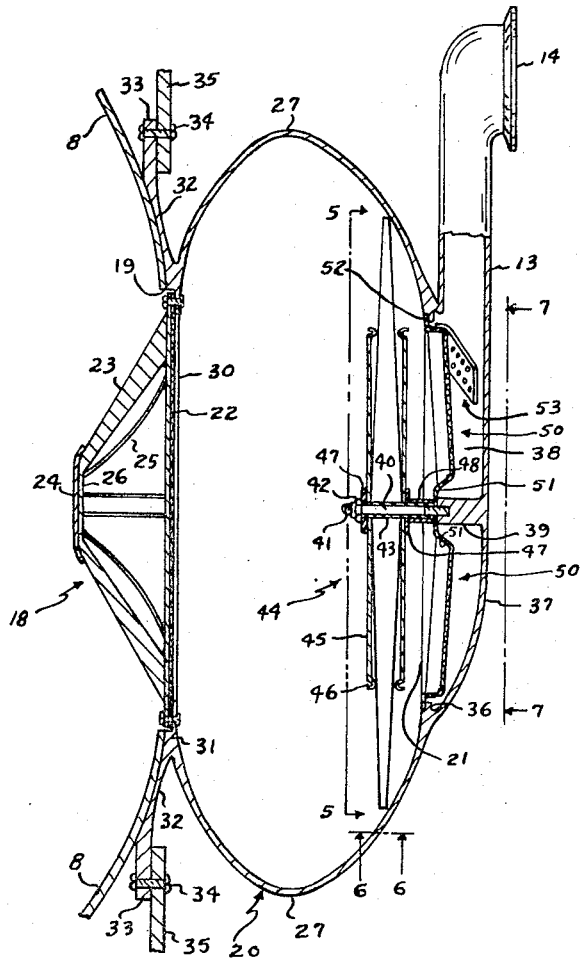

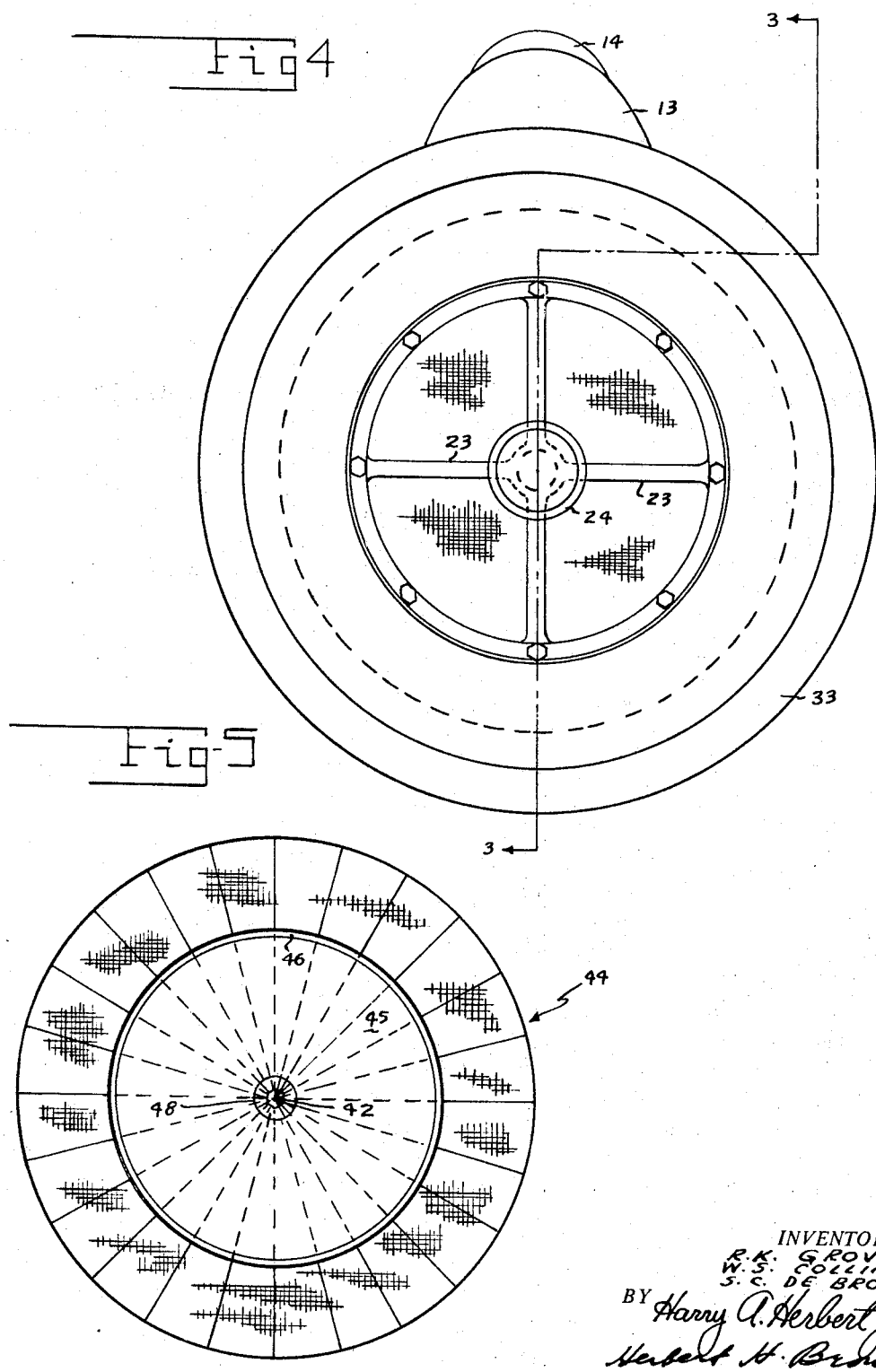

United States Patent Office 3,353,350
Patented Nov. 21, 1967

3,353,350
SUMP FOR SPACE VEHICLES
Robert K. Grove, Los Altos, Walter S. Collins, Cupertino, and Stephen C. De Brock, Saratoga, Calif., assignors, by mesne assignments, to the United States of America as represented by the Secretary of the Air Force
Filed Mar. 28, 1967, Ser. No. 627,255
7 Claims. (Cl. 60—39.48)

ABSTRACT OF THE DISCLOSURE

An improved sump is provided at the outlet of the oxidizer and fuel tanks of a space vehicle operating under low gravity conditions when it becomes necessary to restart the rocket engine. The propellant is prevented from drifting away from the outlet due to "weightless" conditions, and the purpose of the sump is to make an adequate supply of propellant available, notwithstanding the tendency to drift under these conditions. The sump element eliminates the use of rockets heretofore employed to reorient the contents of the tank.

The sump includes a "containment screen" which permits the sump to be completely filled but prevents reverse flow back to the tank, also a "sump screen" to smooth out the flow of the propellant moving toward the engine, and finally, a pair of "velocity control plates" which regulate the rate of flow from the sump to the outlet.

Field of the invention

The invention relates to the oxidizer and fuel supply systems for rocket engines of space vehicles requiring restart of the engine under low gravity conditions.

Space vehicles, such as those of the Agena type, comprise a payload section which might include a space capsule or an explosive weapon. The next portion is constituted of the forward or structural section which contains the guidance and flight controls, also communications and electrical power. The third section usually comprises the tank compartment which houses a dual propellent tank assembly for supplying the rocket engine with fuel and oxidizer under valve controlled conditions. The aft section of the vehicle is given over to the propulsion system, including the engine and thrust chamber, pumps for placing the fuel and oxidizer under pressure, and the turbine for actuating the pumps together with all the necessary propulsion control devices. The thrust chamber is projected rearwardly from the aft section. When boosters are employed in order to attain a higher initial projectory, an adaptor extension is provided next to the aft section to which one or more boosters are attached.

In flight the first stage, or preceding combinations of boosters, provide the velocity, attitude control, and discrete or flight termination commands necessary to initiate or terminate the operation of the vehicle. At separation, a pyrotechnic device releases the vehicle from its booster adaptor and the vehicle, continuing at an undiminished rate, leaves the adapted. When separation has occurred, the vehicle assumes an appropriate attitude, ignites the main propulsion system and continues through a programmed sequence of events. The flight may include injection into a circular orbit, ellipse, parking or transfer orbit, or a trajectory into space. Once established, the orbital plane or space trajectory can be adjusted. The main propulsion system is started and stopped as necessary to satisfy the mission requirements so that the engine must have a multistart capability.

However, it has been found that when the vehicle is travelling under low or substantially zero gravity conditions, as when coasting, the propellants tend to drift away from the outlets of the dual tank, particularly when the tanks are partially depleted, thus rendering the restart of the engine most difficult. In order to avoid this condition, it has been the practice to fire ullage control rockets just prior to engine restart and thus accelerate the vehicle in order to drive the fuel content toward the tank outlets. However, these rockets are disadvantageous from the standpoint of the weight involved and especially from the standpoint of not being altogether reliable.

Summary of the invention

An object of the invention is ot provide an improved means for maintaining the position of the fluid in the region of the outlets of each of the fuel and oxidizer tanks of a spacecraft when operating under near zero gravity conditions.

Another object is to provide a liquid retention device at the tank outlets of a space vehicle and which does not contain any moving parts nor employs a rocket accessory but operates effectively in case of a partially filled tank, regardless of the effect of substantially zero gravity.

These objects are attained in brief by providing specially formed fuel and oxidizer sumps attached to the propellent tanks at the position of each outlet which maintain a steady rate of flow even under conditions of low gravity and at the end of an extended engine shutdown while coasting through space.

Brief description of the drawings

FIG. 1 represents an elevational view of a space vehicle provided with the improved liquid containment sump as applied to an exemplary single stage vehicle;

FIG. 2 shows a fragmentary portion, partly in section, of the space vehicle of FIG. 1, to depict the relative positions of the fuel and oxidizer tanks, also the respective improved sumps;

FIG. 3 is a sectional view of the improved sump construction in enlarged form, shown along line 3—3 in FIG. 4, with a fragmentary portion of the tank and support straps added;

FIG. 4 represents an end view of the sump illustrated in FIG. 3 but without the addition of any showing of the tank and straps;

FIG. 5 depicts a side view of the so-called "pleated screen" portion of the sump structure, shown part from all of the attached elements. This view is taken at about line 5—5 in FIG. 3;

FIG. 6 is an end view of the pleated screen, looking at about the line 6—6 in FIG. 3; and FIG. 7 depicts a view of the so-called "primary" and "secondary" velocity control plate portions of the sump structure, apart from the associated elements. This view is taken at about line 7—7 in FIG. 3.

Description of the preferred embodiment

Referring to FIG. 1, reference character 1 designates, in general, a space vehicle or rocket, actually a single stage without a booster. It will be recognized from the general outline that the vehicle is that of the so-called "Agena." The front end 2 of the vehicle represents the payload which could be a space capsule or, when necessary, an atomic bomb. The payload is attached to the structural portion of the vehicle designated 3 in any suitable manner. This portion contains a number of structural elements, one bracing the other, as indicated at 4 to give the vehicle lateral and longitudinal strength, also to maintain its circular shape in view of the tremendous weight and inertia forces set up during flight. The forward section also provides room for the guidance and control equipment of the craft.

The present invention is concerned more especially with the tank and aft sections designated 5, 6 respectively in FIG. 1. The tank section is shown in more detail in FIG.

2, together with a portion of the aft section 6. As shown in this figure, there are two tanks 7 and 8 which are integrally joined to constitute a dual chamber. The tank assembly is also an integral part of the vehicle space frame and provides the supporting structure and exterior surface of the center portion of the vehicle. The assembly is constructed of welded aluminum, joined together, forming a cylindrical shell with the forward and aft sections. The forward tank section 7 is composed of a cylindrical section and two hemispherical ends. The aft tank section 8 is composed of a cylindrical section and a single hemispherical end. Thus, the first tank 7 serves as part of the wall for the other tank. Tank 7 usually contains hydrogen or other suitable gas, maintained under pressure, by pressurized helium operating through a diaphragm (not shown) while tank 8 contains an oxidizer which is also pressurized.

From the fuel source 7, the gas passes through an improved sump assembly, generally designated at 9, and thence through the conduit 10 to a combined coupling and seal 11. A pump (not shown) is coupled to the element 11, the pump being operated by a turbine (not shown). The latter is actuated by power derived from a combustion chamber (not shown). Eventually the hydrogen, or other fuel, under pump pressure is carried through the necessary conduits and valves to the main combustion chamber. The chamber is positioned within a cylindrical protective shield 15 supported from a structural member 15' (FIG. 2). The shield provides support for an outwardly flaring conically shaped thrust chamber 16.

The oxidizer in tank 8 similarly passes through an improved sump assembly, generally designated at 12, and thence through the conduit 13 to a combined coupling and seal 14. Another pump (not shown) is coupled to the element 14 and driven preferably by the same turbine as drives the fuel pump. The oxidizer, after passing through a number of conduits and control valves of various type, reaches the main combustion chamber.

When the two gases are combined in this chamber in the proper proportion, they are ignited by hypergolic action. This continuous explosive effect gives rise to the generation of large amounts of heated gas which forms fast-moving jets that pass through the thrust chamber 16. The expulsion of these jets to the rear of the vehicle produces a tremendous thrust so that the vehicle can travel at extremely high velocity, even in the region of low gravity.

It will be understood that a space vehicle of the type shown is lifted from the ground to any designed orbit or flight pattern by means of one or more boosters and the latter are operated, usually in succession, either automatically upon gaining the proper altitude, or on command. For this purpose, the vehicle is provided with an adaptor extension device 17 to which a booster can be temporarily attached. The booster or boosters are usually detached by firing retro-rockets (not shown) mounted on the booster to be detached which provides the reverse thrust necessary to reduce the velocity of that booster. As the velocity of the booster is reduced, the part of the vehicle which is left continues on at an undiminished rate and leaves the discarded booster behind. When separation from all the boosters has been accomplished, the vehicle assumes an appropriate attitude and ignites the main propulsion system to establish a particular orbit or trajectory in space. The position of the vehicle may be such that the effect of the earth's gravity is extremely small so that the vehicle can travel at an enormous speed even when the engine is shut down. But, in order to maneuver the craft to a higher or lower orbit, or exert other forms of control, it may be necessary to start up the engine.

However, it has been found that when running under practically "weightless" conditions, and particularly if the tanks 7, 8 are partially depleted, the propellant tends to drift away from the tank outlets so that the engine (main combustion chamber) cannot immediately respond. The liquid appears to hug the surface of the tank in a haphazard manner, usually removed from the position where the conduits 10, 13 leave their respective tanks so that the pumps cannot supply the main combustion chamber with a full charge of the explosive ingredients.

The use of ullage control rockets temporarily to accelerate the vehicle and thus orient the propellant toward the tank outlets have not been entirely satisfactory. In accordance with our invention, a propellent retention system is provided which includes a containment sump attached to the outlet of each tank.

*Detailed description of the improved propellent retention device or sump*

The sump for the tank 7 is indicated generally at 9 in FIG. 2 and for tank 8 at 12. These sumps can be of the same construction but may differ as to size depending on the relative amounts of fuel and oxidizer that is to be used for engine restart purposes. As shown in FIGS. 2 and 3, the sump is provided with a "snout" portion indicated at 18 which is fitted in an opening 19 (FIG. 3) in the tank and extends for a considerable distance therein. This portion is secured in a manner explained hereinafter to a relatively large bulbous chamber 20 having an opening 21 at the side opposite from the portion 18, for receiving an outlet duct 13. The duct is of considerable width as indicated in FIG. 4 and terminates in a circular combined seal and coupling device 14 (FIG. 3) of any suitable and well-known type for making connection to a pump (not shown) which supplies part of the propellant to the main combustion chamber through a pump (not shown).

The portion 18 which is technically called a "containment screen" is formed of a double thickness flat screen bottom plate 22 to which is welded four arms 23 of rectangular cross-section and extending inwardly toward the center and outwardly from the bulbous chamber 20. The outer ends of the arms constitute a flat surface to which is welded a cap piece 24. The latter can be perforated but is preferably made of solid metal so as to provide added strength. Thus, the arms and cap piece form a bridge from which a conically-shaped screen member 25 is suspended. The latter has a flat top piece 26 which merges into a curvilinear side forming a cone configuration. The lower edge of the cone member is welded to the flat screen portion 22. The latter extends outwardly beyond the arms 23 to leave a flat boundary surface which has a number of equidistantly spaced bolts.

The chamber 20 is formed of a relatively thin shell of metal having elliptically shaped ends 27 and flattened sides. The side nearer the containment screen has a round opening 30 which is surrounded by a thick rim portion 31. Extending outwardly and away from the elliptically shaped ends 27, there is a relatively thin flange member 32 which curves outwardly to correspond with the curvature of the tank 8 to which it can be welded. The flange 32 terminates in a thickened outer edge portion 33 which is bolted, as indicated at 34, to a number of support straps 35 secured in any suitable manner to the envelope of the vehicle. Thus, the entire sump is rigidly supported within the vehicle. It will be noted that the only communication between the interior of the tank 8 (or the companion tank 7) is through the screen members 25, 22.

The other side of the sump has a relatively large opening 21 provided with a thickened and inwardly extending lip 36, the purpose of which will be explained presently. The shell is continued past the lip 36 toward the central axis to form a bulge 37 of thin metal which merges into a chamber 38. The latter tapers to form a wide passageway 13 which narrows down to a circular configuration at the upper end in order to support a round coupling seal 14.

The chamber 38 carries an inwardly extending and centrally disposed stud 39. A hole is provided in the stud for tightly receiving a rod 40, the inner end 41 of which is threaded to receive a nut 42. There is a long collar 43 which fits snugly over the rod 40. The inner end of the collar carries a so-called "pleated sump screen" indicated generally at 44. The details of the screen are shown more clearly in FIGS. 5 and 6. It comprises a circular-shaped disk-like member of screen material having a large number of pleats extending out radially from the center. The diametral size of the member is such that it lightly contacts the interior surface of the shell 27. The depth of the pleats taper slightly from the center to the outside edge. In order to force the propellant to flow through the screen only at its outer boundary to follow the surface of the chamber, we provide a circular disk 45 at each side, the disk having a spring lip 46 which bears against the screen. Washers 47 are located on the outer sides of the disks 45 in order to prevent any mashing of the pleats at the center when the member is tightened in position, as will be explained hereinafter.

Next to the outer washer 47, there is a spacer 48 surrounding the collar 43, the outer end of the spacer abutting the inner surface of a so-called "primary velocity plate," generally indicated at 50. This plate is constituted of a dish-like circular member, made of mesh material. The concave portion of the latter is presented to the interior of the chamber 20. Detailed views of the member are shown in FIGS. 3 and 7. The member is pressed to shape and is provided with an inwardly extending hub 51 which is carried by the rod 40 between the spacer 48 and the stud 39. From the hub, the member is pressed downwardly to its greatest depth and then becomes more shallow as the outer periphery is approached. A lip 52 is provided at the periphery of the member 50 which can be supported on the lip 36 of the shell member 27. By tightening the nut 42, both the pleated sump screen and the velocity control plate can be securely mounted on the rod 40. It is apparent that the only path that can be taken by the propellant after leaving the pleated sump screen to reach the outlet duct 13 is through the mesh openings of the control plate 50.

In order further to control the movement of the propellant, we have found it desirable to employ a so-called "secondary velocity control plate" which is generally indicated at 53. This member comprises a short strip of perforated metal welded on to the rounder outer edge of the primary velocity control plate 50 and extending downwardly and diagonally across part of the outlet duct as seen in FIG. 7.

It is to be understood that the construction of the improved sump 9, connected to the fuel tank 7, is substantially the same as that described in connection with the sump structure 12. However, since the tank 7 is farther removed form its pump than tank 8, it is necessary to employ a relatively long conduit 10 to carry the gas to the coupling seal 11 in order to make the pump connection.

*Operation of the improved sump*

In operation, the containment screen 18 (FIG. 3) at the inlet end of the sump provides for the retention of the propellant within the cavities of the sump at all times. Even under exceptionally low gravity conditions, the sump remains substantially full which provides enough oxidizer or fuel to feed the pump and allow the rocket engine to restart after possible coasting for a considerable time under low gravity conditions. With the resulting acceleration, the liquid in the tank is reoriented in bulk over the outlet opening and the contents of the pump are replenished. The screen 25 allows ready access of the propellant into the bulbous portion 20 of the sump from the tank but provides an effective barrier to a haphazard movement or drifting of the contained propellant due to the weightless nature of the fluid during orbital travel. It will be further noted that the fluid, upon reaching the bulbous portion of the sump, would find it very difficult to wander back to the main tank not only on account of the limitations imposed by the relatively small opening 30 but also on account of the restraining effect of the screen 25.

The purpose of the pleated sump screen 44 serves to prevent an excess of flow of gas into the engine which might otherwise partially deplete the sump. It will be noted that the flow takes place beyond the periphery of the disks 45 in order to direct the flow smoothly around the curved bulbous surface of the sump and toward the center of the member 50. Thus, whorling and vortexing of the fluid is prevented. The pleated construction provides the maximum number of openings and thereby assists in offering greater ease of access to the fluid through the annular path.

The sump velocity control plate 50 serves to flatten the local velocity profile produced by the sharp turn in the sump outlet duct, thereby delaying the point at which the free surface is depressed by surface tension into the outlet 13 and in this way lowering the depletion point.

The secondary velocity plate 53 is desirable in order further to regulate, usually to reduce the velocity of the propellant moving through the outlet duct 13. The size and angularity of the perforated strip can be determined empirically or by actual test depending upon the requirements of the rocket engine, also on the size and shape of the outlet 13.

From the foregoing, it is evident that we have disclosed an improved sump structure which can be connected to either or both of the oxidizer and fuel tanks of a space vehicle or missile employing a rocket engine and which will assure a full supply of the propellants after a coasting period and at the moment of restart of the engine under very low gravity conditions.

While a certain specific embodiment has been described, it is obvious that numerous changes may be made without departing from the general principles and scope of the invention.

We claim:

1. A propellent retention device for a propellent supply tank employed in spacecraft designed to restart the engine after the craft has been coasting under low gravity conditions, means for assuring a full supply of propellant when the coasting period has terminated and during which the propellant of a partially full tank would normally have drifted away from the outlet, said means including a relatively large chamber having an opening at one side, a screen containment member fitted over said opening and projecting outwardly from the chamber, said member being of a shape and size as to be inserted into the tank at the position of its outlet whereby the interior of said member is in communication with the interior of the tank in order that the chamber shall receive a full charge of the propellant through said containment member and which is maintained throughout the coasting period until the engine is restarted under low gravity conditions, said chamber having an outlet duct at the side opposite from said container for attachment to a pump and engine, said chamber having an outwardly extending frame at the position of the opening in the chamber, said containment member formed of screen material and having a cone-like configuration supported from said frame, the smaller end of the cone being spanned by screen material which is fitted over said opening in the chamber, said containment member and frame being adapted to be inserted into the tank at the position of its outlet.

2. A propellent retention device according to claim 1 and in which said frame is constituted of metal arms projecting outwardly from the side of the chamber and inwardly toward the center, a cap extending over the outer projecting ends of the arms, the smaller end of said cone-like screen containment member being supported from said cap and the other end of the member being secured to the chamber at the position of said opening whereby the containment member is adapted to be inserted into the tank at the position of its outlet, said chamber having an integral extension of the same shape as the tank in order to be secured thereto after said member has been inserted into the tank.

3. A propellent retention device according to claim 1 and in which said chamber is of circular configuration, said chamber having a transversely extending screen which contacts the inner peripheral surface of the chamber, said last-mentioned screen being positioned between the containment screen member and the outlet duct for directing the propellant along the surface of the chamber on its way to the outlet duct.

4. A propellent retention device according to claim 3 and in which said transversely extending screen is of a pleated character in which the pleats extend radially outward.

5. A propellent retention device according to claim 4 and in which a circular disk of solid material having a diametral size less than that of said peripheral surface of the chamber is positioned flatwise against said radially extending pleats whereby an annular path between the periphery of the disk and the inner surface of the chamber is provided through the pleated screen to constrain the propellant to move along the surface of the chamber.

6. A propellent retention device according to claim 3 and in which said chamber has a circular opening which leads to said outlet duct, and a dish-like screen member which extends across said opening for controlling the velocity of the propellant moving toward the outlet duct.

7. A propellent retention device according to claim 5 and in which the concavity of said dish-like screen member is presented to the interior of the chamber.

References Cited
UNITED STATES PATENTS

| | | | |
|---|---|---|---|
| 3,254,486 | 6/1966 | Kenny | 60—39.48 |
| 3,286,463 | 11/1966 | McGroarty | 60—39.48 |
| 3,300,981 | 1/1967 | Porter | 60—39.48 |

MARK M. NEWMAN, *Primary Examiner.*

D. HART, *Assistant Examiner.*